United States Patent
Kwak

(10) Patent No.: US 10,380,417 B2
(45) Date of Patent: Aug. 13, 2019

(54) METHOD AND APPARATUS FOR RECOGNIZING IRIS

(71) Applicant: Samsung Electronics Co., Ltd., Gyeonggi-do (KR)

(72) Inventor: Han-Shin Kwak, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 23 days.

(21) Appl. No.: 15/503,763

(22) PCT Filed: Sep. 11, 2015

(86) PCT No.: PCT/KR2015/009579
§ 371 (c)(1),
(2) Date: Feb. 14, 2017

(87) PCT Pub. No.: WO2016/039582
PCT Pub. Date: Mar. 17, 2016

(65) Prior Publication Data
US 2017/0255822 A1 Sep. 7, 2017

(30) Foreign Application Priority Data

Sep. 11, 2014 (KR) .................. 10-2014-0120120

(51) Int. Cl.
*G06K 9/00* (2006.01)
*G06K 9/03* (2006.01)
(Continued)

(52) U.S. Cl.
CPC ......... *G06K 9/00604* (2013.01); *G06F 21/30* (2013.01); *G06K 9/00912* (2013.01);
(Continued)

(58) Field of Classification Search
None
See application file for complete search history.

(56) References Cited

U.S. PATENT DOCUMENTS 6,215,891 B1  4/2001  Suzaki et al.
8,818,048 B2 *  8/2014  Du .................. G06K 9/0061
                                                          382/115
(Continued)

FOREIGN PATENT DOCUMENTS

EP    1324259 A1    7/2003
JP   11-150678 A    6/1999
(Continued)

OTHER PUBLICATIONS

Rathgeb, Christian, and Andreas Uhl. "Bit reliability-driven template matching in iris recognition." 2010 Fourth Pacific-Rim Symposium on Image and Video Technology. IEEE, 2010. (Year: 2010).*

(Continued)

*Primary Examiner* — Samah A Beg
(74) *Attorney, Agent, or Firm* — Cha+Reiter, LLC

(57) ABSTRACT

The present disclosure relates to a method and an apparatus for recognizing an iris. The electronic device may include a camera configured to photograph the iris and a processor configured to perform iris recognition by using the photographed iris image, wherein the processor is further configured to determine a part of the iris image for the iris recognition has failed and re-perform the iris recognition for the determined part of the iris image.

12 Claims, 10 Drawing Sheets

(51) Int. Cl.
  *G06F 21/30* (2013.01)
  *G06K 9/46* (2006.01)
  *G06K 9/48* (2006.01)
  *G06K 9/62* (2006.01)
  *H04N 5/232* (2006.01)

(52) U.S. Cl.
  CPC ............... *G06K 9/033* (2013.01); *G06K 9/46* (2013.01); *G06K 9/48* (2013.01); *G06K 9/62* (2013.01); *H04N 5/232* (2013.01)

(56) References Cited

U.S. PATENT DOCUMENTS

| | | | | |
|---|---|---|---|---|
| 8,965,063 B2* | 2/2015 | Hanna | G06K 9/00604 | 382/117 |
| 9,013,271 B2* | 4/2015 | Aoki | G06F 21/32 | 340/5.52 |
| 9,195,817 B2* | 11/2015 | Scully-Power | G06F 21/32 | |
| 9,465,988 B1* | 10/2016 | Marason | G06K 9/00604 | |
| 9,471,765 B1* | 10/2016 | Setterberg | G06K 9/00026 | |
| 9,818,038 B2* | 11/2017 | Yasunaga | G06K 9/3233 | |
| 9,824,272 B2* | 11/2017 | Choi | G06K 9/00604 | |
| 9,916,504 B2* | 3/2018 | Lee | G06K 9/00617 | |
| 10,126,935 B2* | 11/2018 | Hama | G06F 3/0488 | |
| 2001/0040985 A1* | 11/2001 | Okano | G06K 9/033 | 382/117 |
| 2002/0041712 A1 | 4/2002 | Roustaei et al. | | |
| 2006/0165265 A1* | 7/2006 | Fujimatsu | G06K 9/00604 | 382/117 |
| 2006/0210126 A1 | 9/2006 | Cho | | |
| 2009/0169064 A1 | 7/2009 | Kim et al. | | |
| 2010/0021017 A1* | 1/2010 | Bell | G06K 9/00604 | 382/117 |
| 2010/0046808 A1* | 2/2010 | Connell | G06F 21/32 | 382/117 |
| 2010/0239119 A1* | 9/2010 | Bazakos | G06K 9/00261 | 382/103 |
| 2010/0299530 A1 | 11/2010 | Bell et al. | | |
| 2011/0002510 A1* | 1/2011 | Hanna | G06K 9/00604 | 382/117 |
| 2012/0250949 A1* | 10/2012 | Abiko | G06T 1/00 | 382/115 |
| 2012/0326841 A1* | 12/2012 | Aoki | G06F 21/32 | 340/5.82 |
| 2013/0259322 A1 | 10/2013 | Lin et al. | | |
| 2014/0193046 A1* | 7/2014 | Mason | G06K 9/00617 | 382/117 |
| 2015/0254508 A1* | 9/2015 | Kimura | G06K 9/0061 | 382/117 |
| 2016/0021294 A1* | 1/2016 | Tamer | H04N 5/23212 | 382/117 |
| 2016/0092720 A1* | 3/2016 | Lee | G06K 9/00604 | 348/78 |
| 2016/0117544 A1* | 4/2016 | Hoyos | H04N 5/23219 | 348/78 |
| 2016/0171280 A1* | 6/2016 | Han | G06K 9/00067 | 348/77 |
| 2016/0180070 A1* | 6/2016 | Shi | G06K 9/00597 | 726/18 |
| 2016/0180169 A1* | 6/2016 | Bae | G06K 9/00604 | 382/117 |
| 2016/0232408 A1* | 8/2016 | Lee | G06K 9/00617 | |
| 2016/0364561 A1* | 12/2016 | Lee | H04M 1/67 | |
| 2016/0364610 A1* | 12/2016 | Jung | G06K 9/00617 | |
| 2016/0381282 A1* | 12/2016 | Bandlamudi | H04N 5/23212 | 348/240.3 |
| 2017/0017842 A1* | 1/2017 | Ma | G06K 9/00597 | |
| 2017/0070680 A1* | 3/2017 | Kobayashi | H04N 5/23293 | |
| 2017/0091548 A1* | 3/2017 | Agrawal | G06K 9/00604 | |
| 2017/0185103 A1* | 6/2017 | Kim | H04B 1/38 | |
| 2017/0185840 A1* | 6/2017 | Ni | G06K 9/00604 | |
| 2017/0193277 A1* | 7/2017 | Hong | G06F 3/044 | |
| 2017/0206412 A1* | 7/2017 | Kaehler | G06F 3/013 | |
| 2017/0286768 A1* | 10/2017 | Livesay | H04L 67/02 | |
| 2017/0308690 A1* | 10/2017 | Tsukamoto | G06F 21/32 | |
| 2018/0008171 A1* | 1/2018 | Lee | A61B 5/1172 | |
| 2018/0012070 A1* | 1/2018 | Shin | G06K 9/00604 | |
| 2018/0018516 A1* | 1/2018 | Odinokikh | G06K 9/00604 | |
| 2018/0032815 A1* | 2/2018 | Lee | G06K 9/00617 | |
| 2018/0059298 A1* | 3/2018 | Lee | G02B 5/208 | |
| 2018/0060556 A1* | 3/2018 | Fujino | G06F 21/32 | |
| 2018/0087890 A1* | 3/2018 | Cho | G01B 9/02002 | |
| 2018/0218212 A1* | 8/2018 | Yoshikawa | G06F 21/32 | |
| 2018/0276465 A1* | 9/2018 | Lee | G06K 9/00604 | |
| 2018/0307888 A1* | 10/2018 | Yoon | G06K 9/00026 | |

FOREIGN PATENT DOCUMENTS

| | | |
|---|---|---|
| KR | 20040003248 A | 1/2004 |
| KR | 20060056805 A | 5/2006 |

OTHER PUBLICATIONS

Chenhong, Lu, and Lu Zhaoyang. "Efficient iris recognition by computing discriminable textons." Neural Networks and Brain, 2005. ICNN&B'05. International Conference on. vol. 2. IEEE, 2005. (Year: 2005).*

Frigerio, Eliana, et al. "Correction method for nonideal iris recognition." Image Processing (ICIP), 2012 19th IEEE International Conference on. IEEE, 2012. (Year: 2012).*

* cited by examiner

[Fig. 1]
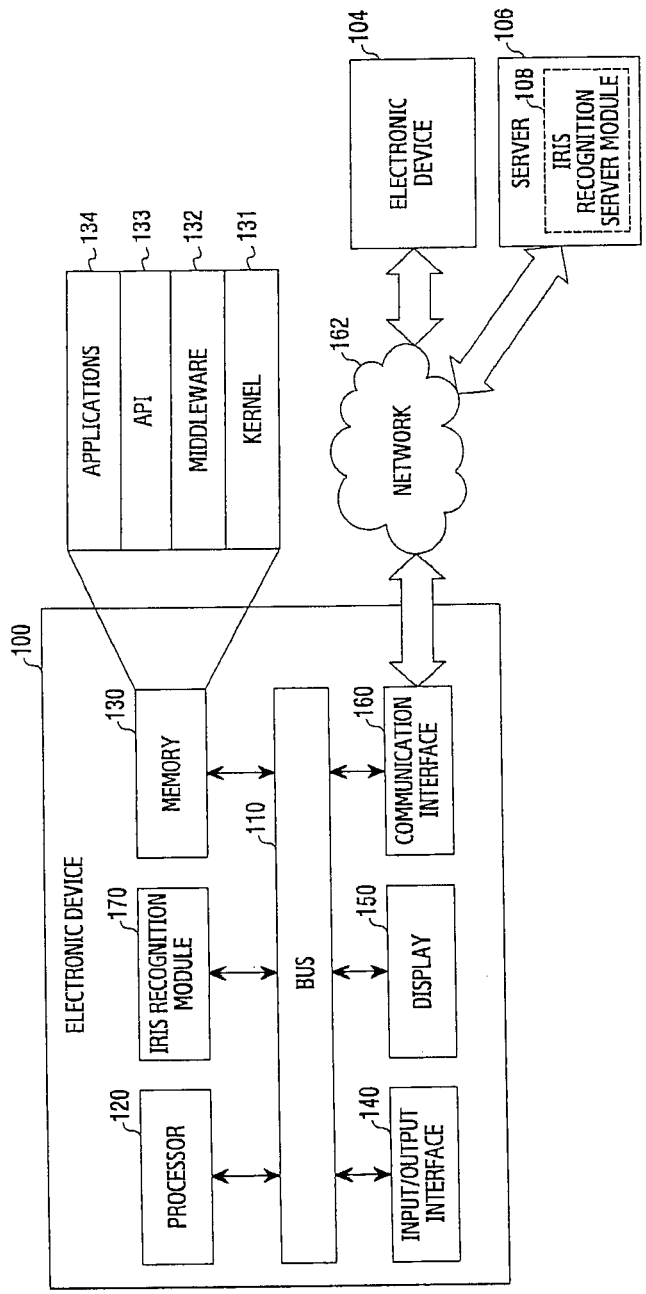

[Fig. 2]
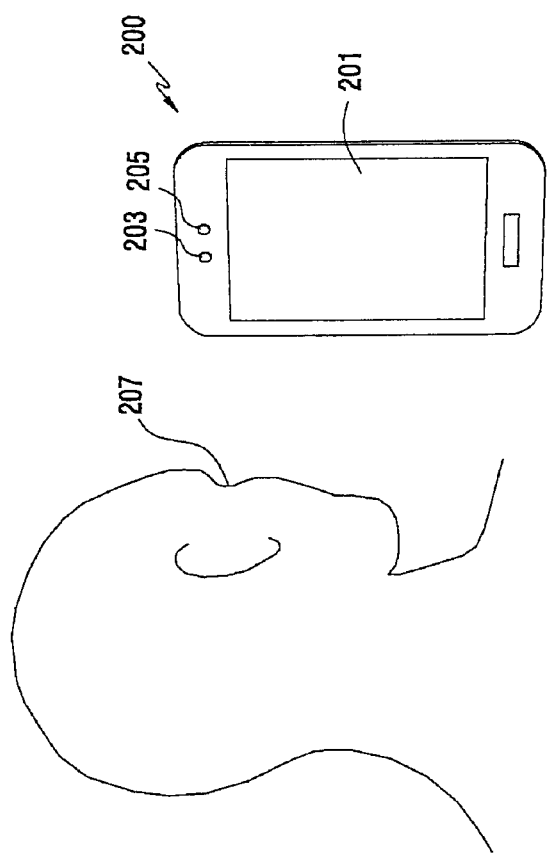

[Fig. 3]
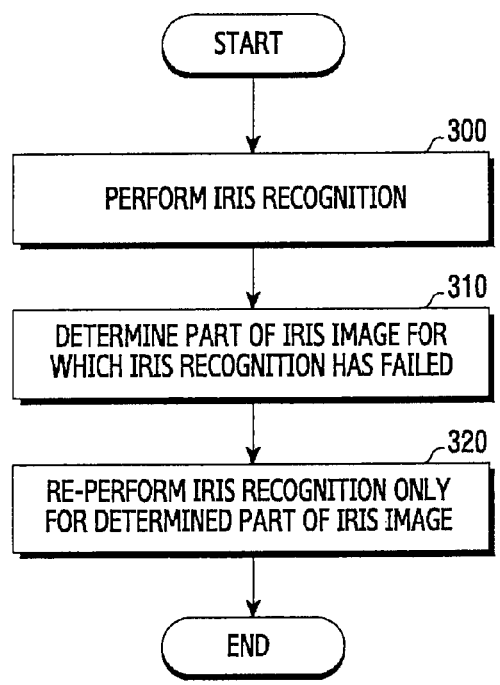

[Fig. 4]
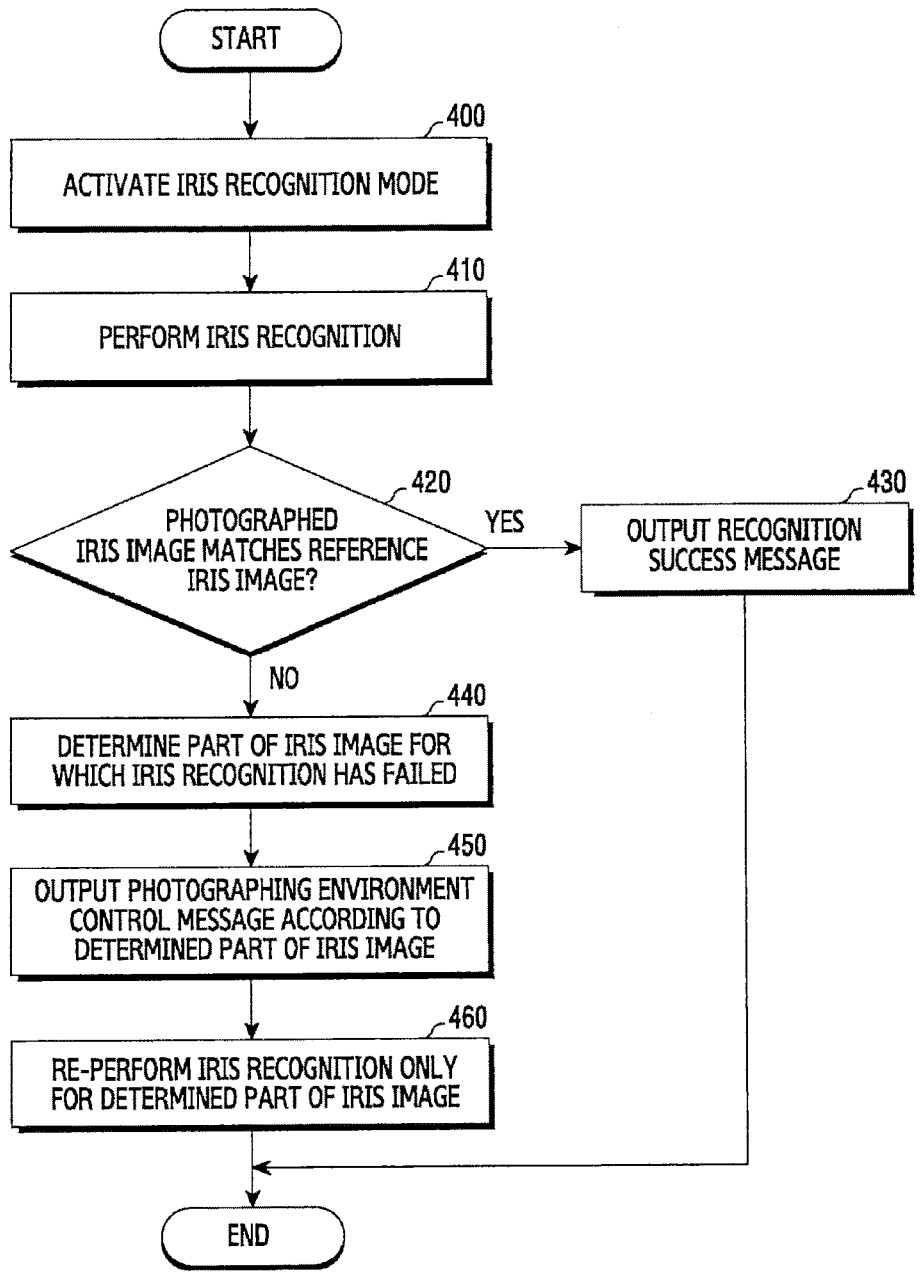

[Fig. 5]
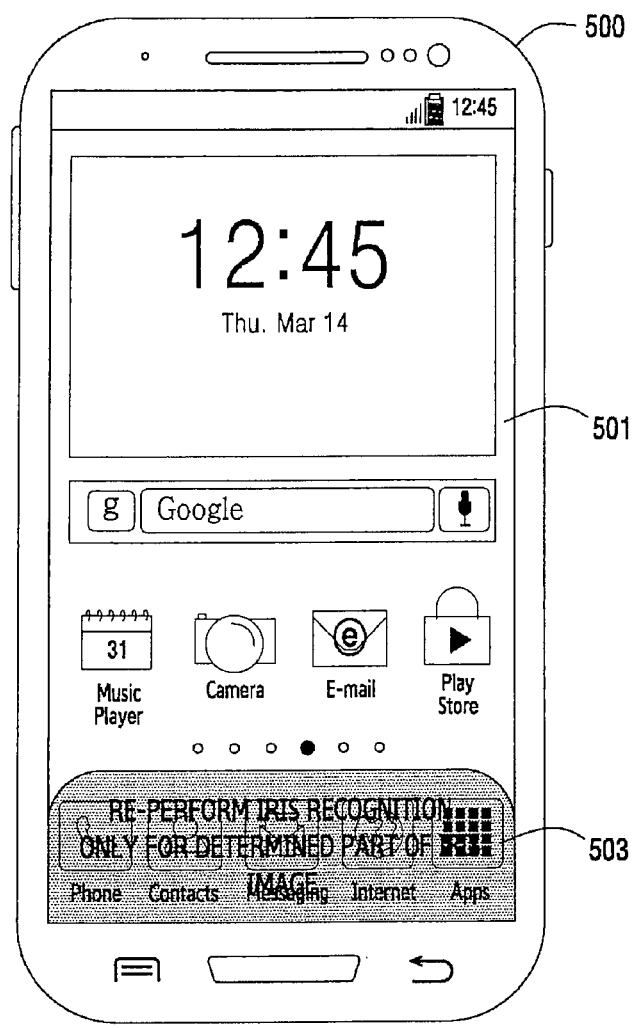

[Fig. 6]
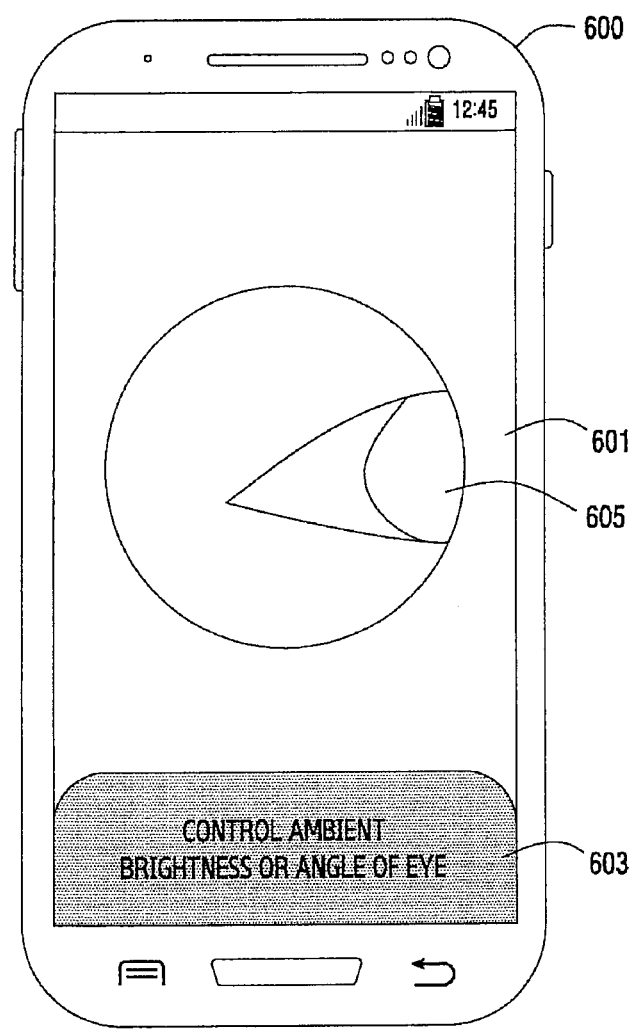

[Fig. 7]
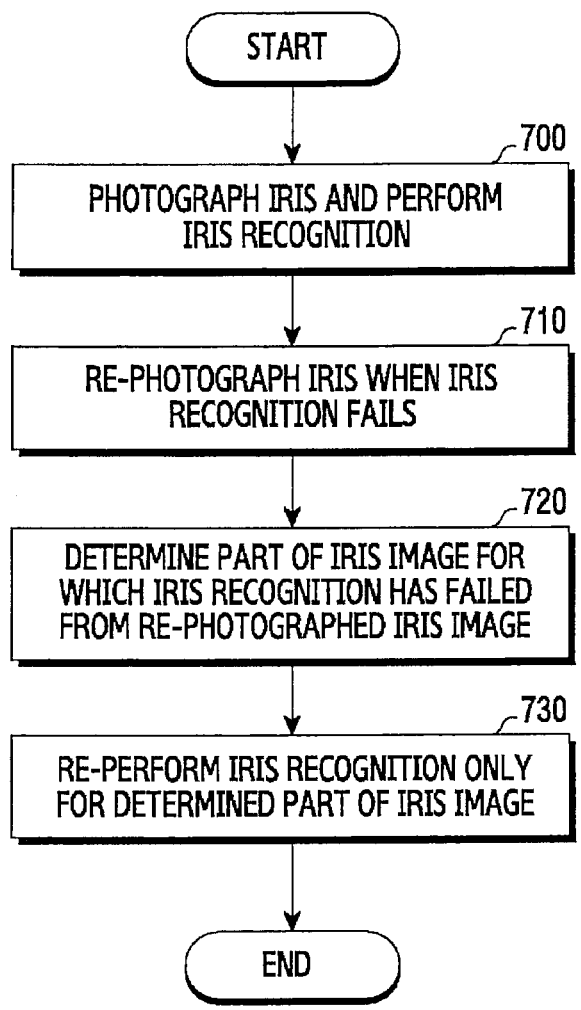

[Fig. 8]
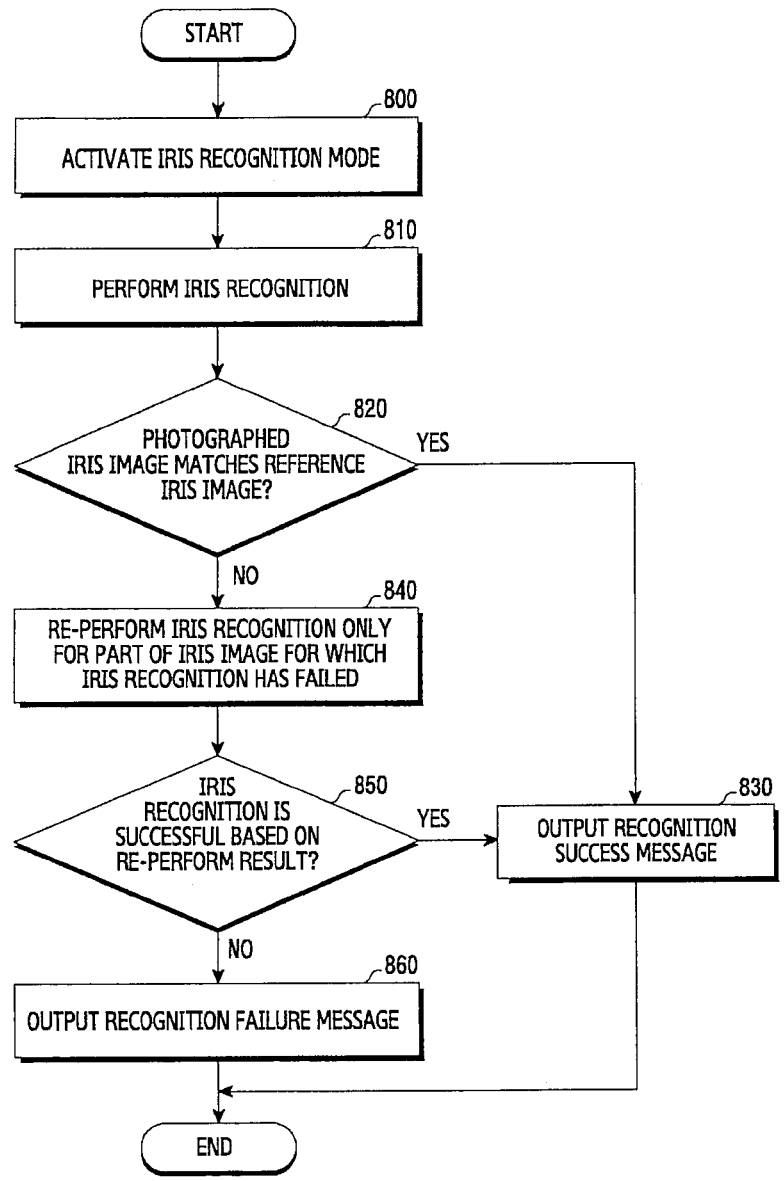

[Fig. 9]
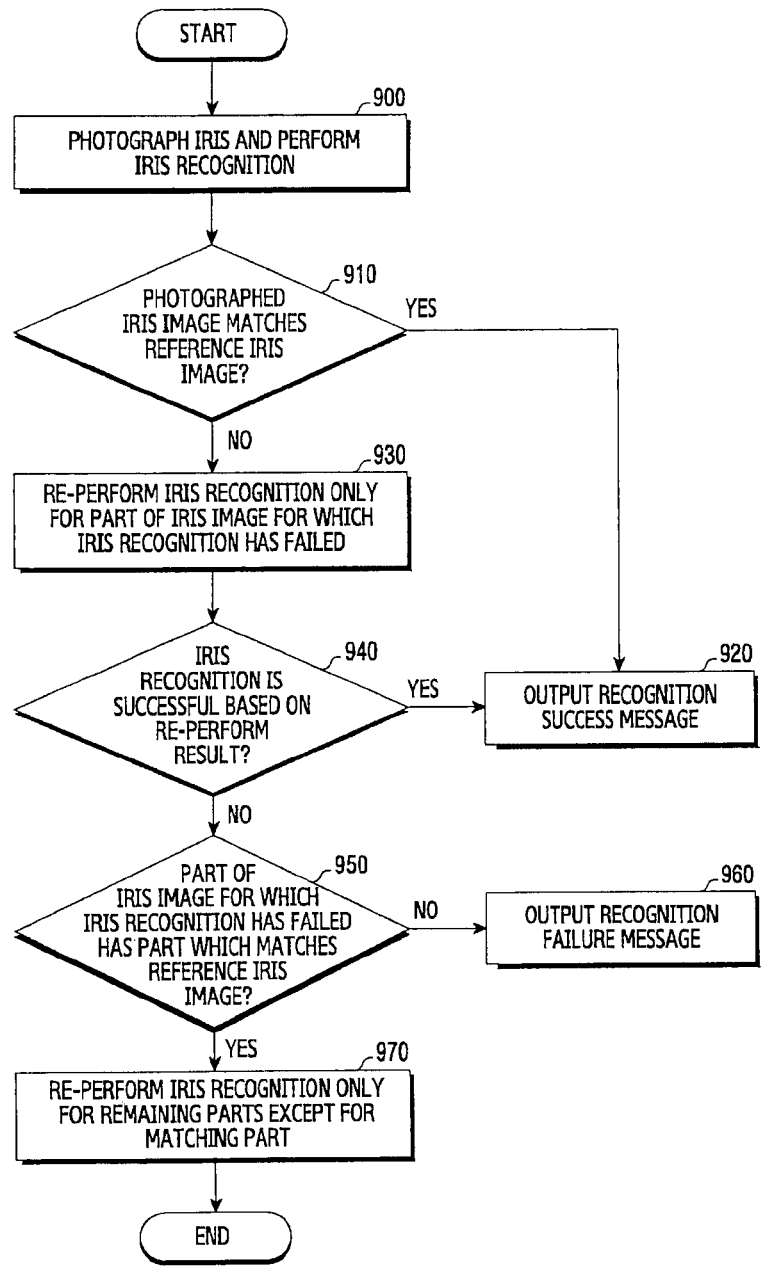

[Fig. 10]
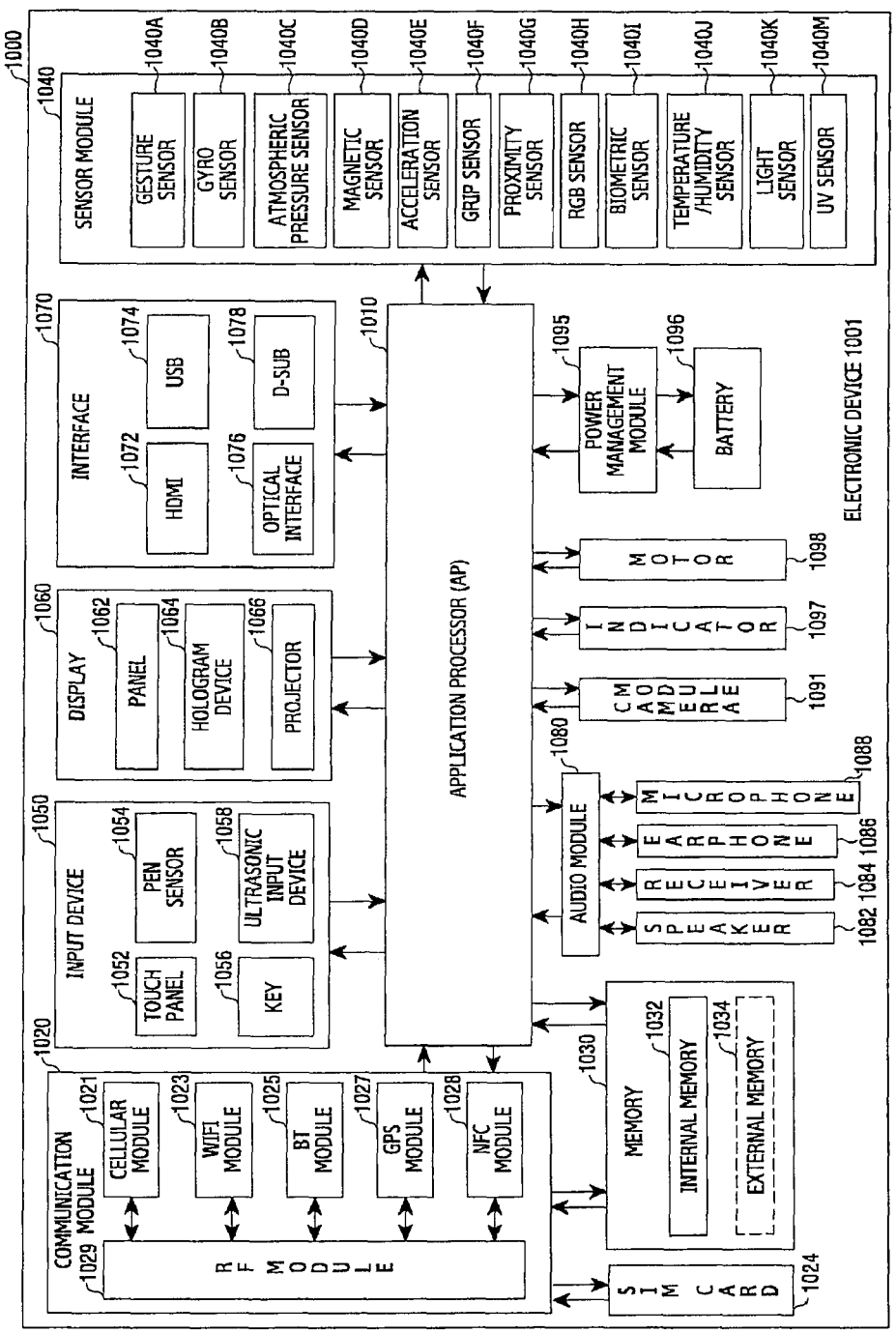

METHOD AND APPARATUS FOR RECOGNIZING IRIS

CLAIM OF PRIORITY

This application is a National Phase Entry of PCT International Application No. PCT/KR2015/009579, which was filed on Sep. 11, 2015, and claims a priority to Korean Patent Application No. 10-2014-0120120, which was filed on Sep. 11, 2014, the contents of which are incorporated herein by reference.

TECHNICAL FIELD

The present disclosure relates to a method and an apparatus for recognizing an iris.

BACKGROUND ART

As information communication technologies and semiconductor technologies have been developed, various electronic devices have been developed as multimedia devices that provide various multimedia services. For example, electronic devices provide various multimedia services such as a messenger service, a broadcasting service, a wireless Internet service, a camera service, and a music reproduction service.

Recently, as personal privacy becomes more important, a security function of locking the electronic device is more enhanced and accordingly, a method of easily photographing a specific part of the user to perform an authentication is proposed. For example, an iris recognition function refers to a function of recognizing a particular person by comparing an iris image photographed by the electronic device with a pre-registered reference iris image based on the feature that irises of all people vary individually.

DISCLOSURE OF INVENTION

Technical Problem

In an entire iris pattern comparison, a conventional iris recognition technology uses a method of comparing an iris image stored for the iris recognition with an iris image photographed by a camera. Such a recognition method fails to recognize the iris when a partial pattern of the iris does not match or some parts are not recognized due to a surrounding environment (for example, brightness of light or angle of the eye). Further, a method of repeatedly photographing an iris image for iris recognition and continuously comparing the photographed entire iris image may increase a misrecognition rate and working time required for the iris recognition.

Various embodiments of the present disclosure may provide an iris recognition method and apparatus which may re-perform iris recognition for a part of the iris image for which the iris recognition has failed.

Various embodiments of the present disclosure may provide an iris recognition method and apparatus which may output a photographing environment control message when the iris recognition fails.

Various embodiments of the present disclosure may provide an iris recognition method and apparatus which may increase an iris recognition rate and reduce an iris recognition time.

Solution to Problem

In accordance with a first aspect of the present disclosure to achieve the object, according to various embodiments of the present disclosure, an operation method of an electronic device includes: performing iris recognition; determining a part of an iris image for which the iris recognition has failed; and re-performing the iris recognition for the determined part of the iris image.

According to various embodiments of the present disclosure, an electronic device includes: a camera module that photographs an iris; and a processor that performs iris recognition by using a photographed iris image, wherein the processor determines a part of the iris image for which the iris recognition has failed and re-performs the iris recognition for the determined part of the iris image.

According to various embodiments of the present disclosure, an operation method of an electronic device includes: performing iris recognition, if the iris recognition fails, determining an area of the iris image for which the iris recognition has failed, and re-performing the iris recognition for the determined part of the iris image.

Advantageous Effects of Invention

An iris recognition method and apparatus according to various embodiments can increase an iris recognition rate and reduce an iris recognition time by re-performing the iris recognition for a part of the iris image for which the iris recognition has failed.

An iris recognition method and apparatus according to various embodiments can output a photographing environment control message if the iris recognition fails and induce a user to improve a surrounding environment, thereby acquiring an accurate iris image.

BRIEF DESCRIPTION OF DRAWINGS

FIG. 1 is a block diagram of an electronic device according to an embodiment of the present disclosure;

FIG. 2 schematically illustrates an electronic device that recognizes an iris according to an embodiment of the present disclosure;

FIG. 3 is a flowchart illustrating a method of recognizing an iris according to an embodiment of the present disclosure;

FIG. 4 is a flowchart illustrating a method of recognizing an iris according to an embodiment of the present disclosure;

FIG. 5 illustrates an example of a message output when iris recognition is successful according to an embodiment of the present disclosure;

FIG. 6 illustrates an example of a message output when iris recognition fails according to an embodiment of the present disclosure;

FIG. 7 is a flowchart illustrating a method of recognizing an iris according to an embodiment of the present disclosure;

FIG. 8 is a flowchart illustrating a method of recognizing an iris according to an embodiment of the present disclosure;

FIG. 9 is a flowchart illustrating a method of recognizing an iris according to an embodiment of the present disclosure; and FIG. 10 is a block diagram of an electronic device according to various embodiments of the present disclosure.

BEST MODE FOR CARRYING OUT THE INVENTION

Hereinafter, the present disclosure is described with reference to the accompanying drawings. The present disclosure may be changed variously and have various embodiments, and specific embodiments are exemplarily described and related detailed descriptions are made in the present specification. However, it should be understood that the various embodiments of the present disclosure are not limited to a specific embodied form and include all modifications and/or equivalents or substitutions that fall within the spirit and technical scope of the present disclosure. In the drawing, like reference numerals are used for like elements.

Expressions such as "include" or "may include", etc. that may be used for the present disclosure indicate existence of a disclosed relevant function, operation, or element, etc., and do not limit additional one or more functions, operations, or elements, etc. Also, it should be understood that terminologies such as "include" or "have", etc. in the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

Expression such as "or", etc. in the present disclosure includes a certain and all combinations of words listed together. For example, "A or B" may include A and may include B, or include both A and B.

In the present disclosure, expressions such as "1st", "2nd", "first" or "second", etc. may modify various elements of the present disclosure but do not limit relevant elements. For example, the expressions do not limit sequence and/or importance, etc. of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element does not exist in the middle.

A terminology used in the present disclosure is used for explaining only a specific embodiment and is not intended for limiting the present disclosure. Unless clearly expressed otherwise, expression of the singular includes expression of the plural.

Unless defined differently, all terminologies used herein including technological or scientific terminologies have the same meaning as that generally understood by a person of ordinary skill in the art to which the present disclosure belongs. It should be understood that generally used terminologies defined by a dictionary have meaning coinciding with meaning on context of a related technology, and unless clearly defined in the present disclosure, they are not understood as an ideal or excessively formal meaning.

An electronic device according to the present disclosure may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, or a wearable device (e.g., a head-mounted-device (HMD) such as electronic glasses, an electronic clothing, an electronic bracelet, an electronic necklace, an electronic appcessory, an electronic tattoo, or a smartwatch).

According to certain embodiments, an electronic device may be a smart home appliance having a communication function. A smart home appliance may include, for example, at least one of a television, a Digital Video Disk (DVD) player, an audio, a refrigerator, an air conditioner, a cleaner, an oven, an electronic range, a washing machine, an air purifier, a set-top box, a TV box (e.g., Samsung HomeSync™, Apple TV™, or Google TV™), game consoles, an electronic dictionary, an electronic key, a camcorder, or an electronic frame.

According to certain embodiments, an electronic device may include at least one of various medical devices (e.g., Magnetic Resonance Angiography (MRA), Magnetic Resonance Imaging (MRI), Computed Tomography (CT), a shooting device, an ultrasonic device, etc.), a navigation device, a Global Positioning System (GPS) receiver, an event data recorder (EDR), a flight data recorder (FDR), an automobile infotainment device, electronic equipment for a ship (e.g., a navigation device for a ship, a gyro compass, etc.), an avionics, a security device, or a robot for an industrial use or a home use.

According to certain embodiments, an electronic device may include at least one of a furniture or a portion of a building/structure including a communication function, an electronic board, an electronic signature receiving device, a projector, or various measurement devices (e.g., waterworks, electricity, gas, or radio wave measuring device, etc.). An electronic device according to the present disclosure may be a combination of one or more of the above-described devices. Also, it is obvious to a person of ordinary skill in the art that the electronic device according to the present disclosure is not limited to the above-described devices.

Hereinafter, an electronic device according to various embodiments of the present disclosure is described with reference to the accompanying drawings. A terminology of a user used in various embodiments may indicate a person who uses an electronic device or a device (e.g., an artificial intelligence electronic device) that uses the electronic device.

FIG. 1A is a view illustrating a network environment 100 including an electronic device 101 according to various embodiments. Referring to FIG. 1, the electronic device 101 may include a bus 110, a processor 120, a memory 130, an input/output (I/O) interface 150, a display 160, and a communication interface 170. The bus 110 may be a circuit for connecting the above-described elements with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

According to various embodiments, the application 147 may include a Short Message Service/Multimedia Messaging Service SMS/MMS application, an e-mail application, a calendar application, alarm application, a health care application (e.g., an application for measuring quantity of motion or blood sugar, etc.), or an environment information application (e.g., an application providing atmospheric pressure, humidity or temperature information, etc.). Additionally or alternatively, the application 147 may be an application related to information exchange between the electronic device 101 and an external electronic device (e.g., the electronic device 102 or 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 102 or 104). Additionally or alternatively, the notification relay application may, for example, receive notification information from an external electronic device (e.g., the electronic device 102 or 104) and provide the same to a user. The device management application may manage (e.g., install, delete, or update) a function (e.g., turn-on/turn-off of an external electronic device itself (or some constituent part) or luminance (or resolution) control of a display) of an external electronic device (e.g., the electronic device 102 or 104) communicating with the electronic device 101 and an application operating in the external electronic device or a service (e.g., a communication service or a message service) provided by the external electronic device.

According to various embodiments, the application 147 may include a designated application depending on an attribute (e.g., a kind of an electronic device) of the external electronic device (e.g., the electronic device 104). For example, in the case where the external electronic device is an MP3 player, the application 147 may include an application related to music reproduction. Similarly, in the case where the external electronic device is a mobile medical health care device, the application 147 may include an application related to health care.

According to an embodiment, the application 147 may include at least one of an application designated in the electronic device 101 and an application received from the external electronic device (e.g., the server 106, the electronic device 102 or 104).

The I/O interface 150 may transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

According to an embodiment, the display 160 may display a contact list based on a priority of each of the contacts included in the contact list. For example, the priority of the contacts may be determined based on at least one of a transmission history, a transmission frequency, a transmission speed, a charging policy, intimacy, a counterpart's location, a schedule, or application preference.

According to an embodiment, the display 160 may display a service list based on a priority of each of the applications or services included in the service list. For example, the priority of the applications or services may be determined based on configuration information of a service provider, configuration information of a manufacturer, contact information, application preference, user preference, a use time point, a distance from a target to share contents, a transmission history, and a charging policy.

The communication interface 170 may connect communication between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wireless communication may include at least one of, for example, WiFi, Bluetooth, BLE, Zigbee, Infrared (IR) communication, and ultrasonic communication as a short-range communication protocol 164.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

FIG. 2 schematically illustrates an electronic device that recognizes an iris according to an embodiment of the present disclosure.

Referring to FIG. 2, an electronic device 200 may include a light emission module 205, a camera module 203, and a display 201 which are installed in the front surface of the electronic device 200. For example, the light emission module 205 and the camera module 203 may be configured as one module and may be installed in the rear surface of the electronic device 200.

According to an embodiment, the light emission module 205 may be a module that emits a light to acquire a captured image of an iris 207. For example, the light emission module 205 may emit the light while the camera module 203 photographs the iris 207 to recognize the iris. According to an embodiment, the light emission module 205 may include an element that may emit an infrared ray. For example, the light emission module 205 may be a Light Emitting Diode (LED) or an Organic Light Emitting Diode (OLED), but is not limited thereto.

According to an embodiment, the camera module 203 may be a module for photographing the iris 207. For example, the camera module 203 may photograph the iris 207 spotlighted by the light emitted from the light emission module 205 in an iris recognition mode. According to an embodiment, the camera module 203 may include an image processing module for processing the iris image acquired by the camera module 203 to be suitable for the authentication and an authentication module for performing the authentication by using the image processed by the image processing module.

According to an embodiment, the display 201 may display an iris recognition result message and a photographing environment control message. According to an embodiment, when the iris image acquired by the camera module 203 is equal to the stored reference iris image, the display 201 may output a notification message such as "the photographed iris image is equal to the configured iris image". The photographing environment control message may be a message output to control the environment (for example, brightness of the light or an angle of the eye) when the iris is photographed. According to an embodiment, if the iris recognition fails, the display 201 may output a notification message such as "control ambient brightness or an angle of the eye". For example, when the photographed iris leans toward the left or right side from the center, the display 201 may induce the user to control a location of the eye through the photographing environment control message.

According to an embodiment, the display 201 may display the iris image photographed for the iris recognition. For example, the user may control the photographing environment (for example, brightness of the light or the angle of the eye) by identifying the iris image displayed on the display 201. The photographing environment control message may be output as a voice and output through an LED or a vibration.

The electronic device according to various embodiments of the present disclosure may include a camera module that photographs an iris and a processor that performs iris recognition by using the photographed iris image. The processor may determine a part of the iris image for which the iris recognition has failed and re-perform the iris recognition for the determined part of the iris image.

According to various embodiments, the processor may perform the iris recognition by comparing the photographed iris image with a stored reference iris image.

According to various embodiments, if the iris recognition fails, the processor may determine a part having low similarity by comparing photographed iris image data with stored reference iris image data According to various embodiments, if the iris recognition fails, the processor may make a control to re-photograph the iris.

According to various embodiments, the processor may output a photographing environment control message according to the determined part of the iris image.

According to various embodiments, the processor may re-perform the iris recognition for the re-photographed iris image corresponding to the determined part of the iris image.

According to various embodiments, the processor may change at least one of a color, saturation, and brightness of at least the determined part of the iris image and re-perform the iris recognition.

FIG. 3 is a flowchart illustrating a method of recognizing an iris according to an embodiment of the present disclosure.

Referring to FIG. 3, the electronic device (for example, the electronic device 100) may perform iris recognition in operation 300. According to an embodiment, the electronic device may activate an iris recognition mode. For example, the iris recognition mode may be a mode for photographing a user's iris and comparing the photographed iris image with a pre-stored reference iris image, so as to perform an authentication. According to an embodiment, the electronic device may emit an infrared ray through the light emission module and prepare the photographing of the iris through the camera module. According to an embodiment, the electronic device may emit the infrared ray to detect the iris and photograph the iris when the detected iris approaches within a predetermined distance. For example, the electronic device may perform the iris recognition by comparing the photographed iris image with the stored reference iris image. In another example, the electronic device may perform the iris recognition by dividing the photographed iris image and comparing the divided photographed iris image with divided reference iris images.

In operation 310, the electronic device may determine a part of the iris image for which the iris recognition has failed. According to an embodiment, if the iris recognition fails, the electronic device may determine a part having low similarity by comparing the photographed iris image data with the stored reference iris image data. According to an embodiment, the electronic device may generate an iris pattern of the photographed iris image and compare and examine the generated iris pattern and the stored iris pattern to determine the part having low similarity. According to an embodiment, if the iris recognition fails, the electronic device may overlap the photographed iris image and the reference iris image to determine the part having low similarity. According to an embodiment, the electronic device may compare the divided photographed iris images with the divided reference iris images to determine the non-matching iris image.

In operation 320, the electronic device may re-perform the iris recognition for the determined part of the iris image. According to an embodiment, after re-photographing the iris, the electronic device may compare again the re-photographed iris image corresponding to the part of the iris image for which the recognition has failed. According to an embodiment, the electronic device may compare again the iris image for which the recognition has failed without re-photographing the iris. For example, the electronic device may change at least one of a color, saturation, and brightness of at least the part of the iris image, for which the recognition has failed, and compare again the changed iris image with the reference iris image. According to an embodiment, the electronic device may combine the iris image and iris image surrounding environment correction data to change the color, saturation, or brightness of at least the part of the iris image, thereby making a clearer iris image pattern. However, the present disclosure is not limited thereto, and there are various methods of re-performing the iris recognition for the part of the iris image.

According to an embodiment, when the iris is re-photographed for the re-perform of the iris recognition, the electronic device may output a photographing environment control message according to the determined part of the iris image. For example, the photographing environment control message may be a message output to control the environment (for example, brightness of the light or an angle of the eye) when the iris is photographed. According to an embodiment, as illustrated in FIG. 6, an electronic device 600 may output a notification message 603 such as "control ambient brightness or an angle of the eye" on a display 601. For example, when a photographed iris 605 leans toward the left or right side from the center, the electronic device 600 may induce the user to control a location of the eye through the notification message 603. According to an embodiment, the electronic device 600 may show the determined part of the iris image to the user. That is, the electronic device may allow the user to identify the part of the iris image, for which the recognition has failed, displayed on the display 601 and induce the user to control the photographing environment (for example, brightness of the light or the angle of the eye). For example, the notification message 603 may be output as a voice and output through an LED or a vibration.

FIG. 4 is a flowchart illustrating a method of recognizing an iris according to an embodiment of the present disclosure.

Referring to FIG. 4, the electronic device (for example, the electronic device 100) may activate an iris recognition mode in operation 400. For example, the iris recognition mode may be a mode for photographing a user's iris and comparing the photographed iris image with a pre-stored reference iris image, so as to perform an authentication. According to an embodiment, the electronic device may emit an infrared ray through the light emission module and prepare the photographing of the iris through the camera module.

In operation 410, the electronic device may perform the iris recognition. According to an embodiment, the electronic device may emit the infrared ray to detect the iris and photograph the iris when the detected iris approaches within a predetermined distance. For example, the electronic device may perform the iris recognition by comparing the photographed iris image with the stored reference iris image. In another example, the electronic device may perform the iris recognition by dividing the photographed iris image and comparing the divided photographed iris image with divided reference iris images.

In operation 420, the electronic device may determine whether the photographed iris image matches the reference iris image. According to an embodiment, the electronic device may determine similarity by comparing and examining the iris image photographed through the camera module and the pre-stored reference iris image. According to an embodiment, the electronic device may generate an iris pattern of the photographed iris image and compare and examine the generated iris pattern and the stored iris pattern to determine the similarity. For example, the electronic device may determine whether the photographed iris image matches the reference iris image by overlapping the photographed iris image and the reference iris image and then determining whether similarity is high or low.

When the photographed iris image matches the reference iris image, the electronic device may output a recognition success message in operation 430. According to an embodiment, when the photographed iris image matches the reference iris image, the electronic device 500 may output a notification message 503 such as "the photographed iris image is equal to the stored iris image" through the display 501 and then release a lock setting. According to an embodiment, when the photographed iris image matches the reference iris image, the electronic device 500 may execute an application related to personal information or perform a preset operation. For example, the notification message 503 may be output as a voice and output through an LED or a vibration.

When the photographed iris image does not match the reference iris image, the electronic device may determine a part of the iris image for which the iris recognition has failed in operation 440. According to an embodiment, the electronic device may generate an iris pattern of the photographed iris image and compare and examine the generated iris pattern and the stored iris pattern to determine a part having low similarity. According to an embodiment, the electronic device may determine the part having low similarity by overlapping the photographed iris image and the reference iris image. According to an embodiment, the electronic device may compare the divided photographed iris images with the divided reference iris images to determine the non-matching iris image.

In operation 450, the electronic device may output a photographing environment control message according to the determined part of the iris image. For example, the photographing environment control message may be a message output to control the environment (for example, brightness of the light or an angle of the eye) when the iris is photographed. According to an embodiment, as illustrated in FIG. 6, an electronic device 600 may output a notification message 603 such as "control ambient brightness or an angle of the eye" on a display 601. For example, when a photographed iris 605 leans toward the left or right side from the center, the electronic device 600 may induce the user to control a location of the eye through the notification message 603. According to an embodiment, the electronic device 600 may show the determined part of the iris image to the user. That is, the electronic device may allow the user to identify the part of the iris image, for which the recognition has failed, displayed on the display 601 and induce the user to control the photographing environment (for example, brightness of the light or the angle of the eye). For example, the notification message 603 may be output as a voice and output through an LED or a vibration.

In operation 460, the electronic device may re-perform the iris recognition for the determined part of the iris image. According to an embodiment, after re-photographing the iris, the electronic device may compare again the re-photographed iris image corresponding to the part of the iris image for which the recognition has failed. According to an embodiment, the electronic device may compare again the part of the iris image for which the recognition has failed without re-photographing the iris. For example, the electronic device may change at least one of a color, saturation, and brightness of at least the part of the iris image, for which the recognition has failed, and compare again the changed iris image with the reference iris image. According to an embodiment, the electronic device may combine the iris image and iris image surrounding environment correction data to change the color, saturation, or brightness of at least the part of the iris image, thereby making a clearer iris image pattern. However, the present disclosure is not limited thereto, and there are various methods of re-performing the iris recognition for the part of the iris image.

FIG. 7 is a flowchart illustrating a method of recognizing an iris according to an embodiment of the present disclosure.

Referring to FIG. 7, the electronic device (for example, the electronic device 100) may photograph an iris and perform iris recognition in operation 700. According to an embodiment, the electronic device may activate an iris recognition mode. For example, the iris recognition mode may be a mode for photographing a user's iris and comparing the photographed iris image with a pre-stored reference iris image, so as to perform an authentication. According to an embodiment, the electronic device may emit an infrared ray through the light emission module and prepare the photographing of the iris through the camera module. According to an embodiment, the electronic device may emit the infrared ray to detect the iris and photograph the iris when the detected iris approaches within a predetermined distance. For example, the electronic device may perform the iris recognition by comparing the photographed iris image with the stored reference iris image. In another example, the electronic device may perform the iris recognition by dividing the photographed iris image and comparing the divided photographed iris image with divided reference iris images.

If the iris recognition fails, the electronic device may re-photograph the iris in operation 710. According to an embodiment, when the photographed iris image does not match the reference iris image, the electronic device may re-acquire the iris image to re-perform the iris recognition.

In operation 720, the electronic device may determine a part of the iris image for which the iris recognition fails from the re-photographed iris image. According to an embodiment, the electronic device may determine the part having low similarity from the re-photographed iris image by comparing and examining the initially photographed iris image and the reference iris image.

In operation 730, the electronic device may re-perform the iris recognition for the determined part of the iris image. According to an embodiment, the electronic device may compare again the re-photographed iris image corresponding to the iris image for which the recognition has failed. According to an embodiment, the electronic device may compare the determined part of the iris image with the reference iris image to determine whether the images match each other.

FIG. 8 is a flowchart illustrating a method of recognizing an iris according to an embodiment of the present disclosure.

Referring to FIG. 8, the electronic device (for example, the electronic device 100) may activate an iris recognition mode in operation 800. For example, the iris recognition mode may be a mode for photographing a user's iris and comparing the photographed iris image with a pre-stored reference iris image, so as to perform an authentication. According to an embodiment, the electronic device may emit an infrared ray through the light emission module and prepare the photographing of the iris through the camera module.

In operation 810, the electronic device may perform the iris recognition. According to an embodiment, the electronic device may emit the infrared ray to detect the iris and photograph the iris when the detected iris approaches within a predetermined distance. For example, the electronic device may perform the iris recognition by comparing the photographed iris image with the stored reference iris image. In another example, the electronic device may perform the iris recognition by dividing the photographed iris image and comparing the divided photographed iris image with divided reference iris images.

In operation 820, the electronic device may determine whether the photographed iris image matches the reference iris image. According to an embodiment, the electronic device may determine similarity by comparing and examining the iris image photographed through the camera module and the pre-stored reference iris image. According to an embodiment, the electronic device may generate an iris pattern of the photographed iris image and compare and examine the generated iris pattern and the stored iris pattern to determine the similarity. For example, the electronic device may determine whether the photographed iris image matches the reference iris image by overlapping the photographed iris image and the reference iris image and then determining whether similarity is high or low.

When the photographed iris image matches the reference iris image, the electronic device may output a recognition success message in operation 830. According to an embodiment, when the photographed iris image matches the reference iris image, the electronic device 500 may output the notification message 503 such as "the photographed iris image is equal to the stored iris image" through the display 501 and then release a lock setting as illustrated in FIG. 5. According to an embodiment, when the photographed iris image matches the reference iris image, the electronic device 500 may execute an application related to personal information or perform a preset operation. For example, the notification message 503 may be output as a voice and output through an LED or a vibration.

When the photographed iris image does not match the reference iris image, the electronic device may re-perform the iris recognition for a part of the iris image for which the iris recognition has failed in operation 840. According to an embodiment, the electronic device may determine the part of the iris image for which the iris recognition fails. According to an embodiment, the electronic device may generate an iris pattern of the photographed iris image and compare and examine the generated iris pattern and the stored iris pattern to determine the part having low similarity. According to an embodiment, the electronic device may determine the part having low similarity by overlapping the photographed iris image and the reference iris image. According to an embodiment, the electronic device may compare the divided photographed iris images with the divided reference iris images to determine the non-matching iris image. According to an embodiment, the electronic device may compare the determined part of the iris image with the reference iris image to determine whether the images match each other.

According to an embodiment, after re-photographing the iris, the electronic device may compare again the re-photographed iris image corresponding to the part of the iris image, for which the recognition has failed. According to an embodiment, the electronic device may compare again the part of the iris image for which the recognition has failed without re-photographing the iris. For example, the electronic device may change at least one of a color, saturation, and brightness of at least the part of the iris image, for which the recognition has failed, and compare again the changed iris image with the reference iris image. According to an embodiment, the electronic device may combine the iris image and iris image surrounding environment correction data to change the color, saturation, or brightness of at least the part of the iris image, thereby making a clearer iris image pattern. However, the present disclosure is not limited thereto, and there are various methods of re-performing the iris recognition for the part of the iris image.

According to an embodiment, when the iris is re-photographed for the re-perform of the iris recognition, the electronic device may output a photographing environment control message according to the determined part of the iris image. For example, the photographing environment control message may be a message output to control the environment (for example, brightness of the light or an angle of the eye) when the iris is photographed. According to an embodiment, as illustrated in FIG. 6, the electronic device 600 may output the notification message 603 such as "control ambient brightness or an angle of the eye" on the display 601. For example, when a photographed iris 605 leans toward the left or right side from the center, the electronic device 600 may induce the user to control a location of the eye through the notification message 603. According to an embodiment, the electronic device 600 may show the determined part of the iris image to the user. That is, the electronic device may allow the user to identify the part of the iris image, for which the recognition has failed, displayed on the display 601 and induce the user to control the photographing environment (for example, brightness of the light or the angle of the eye). For example, the notification message 603 may be output as a voice and output through an LED or a vibration.

In operation 850, the electronic device may determine whether the iris recognition is successful based on a result of the re-perform of the iris recognition. According to an embodiment, the electronic device may determine whether the part of the iris image, for which the iris recognition has failed, matches the reference iris image based on a result of the re-perform of the iris recognition.

When the iris recognition is successful based on the result of the re-perform, the electronic device may output a recognition success message in operation 830.

When the iris recognition fails based on the result of the re-perform, the electronic device may output a recognition failure message in operation 860. According to an embodiment, the electronic device may output a notification message such as "non-matching user".

FIG. 9 is a flowchart illustrating a method of recognizing an iris according to an embodiment of the present disclosure.

Referring to FIG. 9, the electronic device (for example, the electronic device 100) may photograph an iris and perform iris recognition in operation 900. According to an embodiment, the electronic device may activate an iris recognition mode. For example, the iris recognition mode may be a mode for photographing a user's iris and comparing the photographed iris image with a pre-stored reference iris image, so as to perform an authentication. According to an embodiment, the electronic device may emit an infrared ray through the light emission module and prepare the photographing of the iris through the camera module. According to an embodiment, the electronic device may emit the infrared ray to detect the iris and photograph the iris when the detected iris approaches within a predetermined distance. For example, the electronic device may perform the iris recognition by comparing the photographed iris image with the stored reference iris image. In another example, the electronic device may perform the iris recognition by dividing the photographed iris image and comparing the divided photographed iris image with divided reference iris images.

In operation 910, the electronic device may determine whether the photographed iris image matches the reference iris image. According to an embodiment, the electronic device may determine similarity by comparing and examining the iris image photographed through the camera module and the pre-stored reference iris image. According to an embodiment, the electronic device may generate an iris pattern of the photographed iris image and compare and examine the generated iris pattern and the stored iris pattern to determine the similarity. For example, the electronic device may determine whether the photographed iris image matches the reference iris image by overlapping the photographed iris image and the reference iris image and then determining whether similarity is high or low.

When the photographed iris image matches the reference iris image, the electronic device may output a recognition success message in operation 920. According to an embodiment, when the photographed iris image matches the reference iris image, the electronic device 500 may output the notification message 503 such as "the photographed iris image is equal to the stored iris image" through the display 501 and then release a lock setting as illustrated in FIG. 5. According to an embodiment, when the photographed iris image matches the reference iris image, the electronic device 500 may execute an application related to personal information or perform a preset operation. For example, the notification message 503 may be output as a voice and output through an LED or a vibration.

When the photographed iris image does not match the reference iris image, the electronic device may re-perform the iris recognition for the part of the iris image for which the iris recognition has failed in operation 930. According to an embodiment, the electronic device may determine the part of the iris image for which the iris recognition fails. According to an embodiment, the electronic device may generate an iris pattern of the photographed iris image and compare and examine the generated iris pattern and the stored iris pattern to determine the part having low similarity. According to an embodiment, the electronic device may determine the part having low similarity by overlapping the photographed iris image and the reference iris image. According to an embodiment, the electronic device may compare the divided photographed iris images with the divided reference iris images to determine the non-matching iris image. According to an embodiment, the electronic device may compare the determined part of the iris image with the reference iris image to determine whether the images match each other.

According to an embodiment, after re-photographing the iris, the electronic device may compare again the part of the iris image, for which the recognition has failed, among the re-photographed iris image. According to an embodiment, the electronic device may compare again the part of the iris image for which the recognition has failed without re-photographing the iris. For example, the electronic device may change at least one of a color, saturation, and brightness of at least the part of the iris image, for which the recognition has failed, and compare again the changed iris image with the reference iris image. However, the present disclosure is not limited thereto, and there are various methods of re-performing the iris recognition for the part of the iris image.

According to an embodiment, when the iris is re-photographed for the re-perform of the iris recognition, the electronic device may output a photographing environment control message according to the determined part of the iris image. For example, the photographing environment control message may be a message output to control the environment (for example, brightness of the light or an angle of the eye) when the iris is photographed. According to an embodiment, as illustrated in FIG. 6, an electronic device 600 may output the notification message 603 such as "control ambient brightness or an angle of the eye" on the display 601. For example, when a photographed iris 605 leans toward the left or right side from the center, the electronic device 600 may induce the user to control a location of the eye through the notification message 603. According to an embodiment, the electronic device 600 may show the determined part of the iris image to the user. That is, the electronic device may allow the user to identify the part of the iris image, for which the recognition has failed, displayed on the display 601 and induce the user to control the photographing environment (for example, brightness of the light or the angle of the eye). For example, the notification message 603 may be output as a voice and output through an LED or a vibration.

In operation 940, the electronic device may determine whether the iris recognition is successful based on a result of the re-perform of the iris recognition. According to an embodiment, the electronic device may determine whether the part of the iris image, for which the iris recognition has failed, matches the reference iris image based on a result of the re-perform of the iris recognition.

When the iris recognition is successful based on the result of the re-perform, the electronic device may output a recognition success message in operation 920.

When the iris recognition fails based on the result of the re-perform, the electronic device may determine whether the part of the iris image for which the iris recognition has failed has a part which matches the reference iris image in operation 950. According to an embodiment, the electronic device may determine whether the part of the iris image for which the iris recognition has failed has a part which matches the reference iris image based on a result of the re-perform of the iris recognition.

When there is no matching part, the electronic device may output a recognition failure message in operation 960. According to an embodiment, the electronic device may output a notification message such as "non-matching user".

When there is the matching part, the electronic device may re-perform the iris recognition for the remaining parts except for the matching part in operation 970. According to an embodiment, the electronic device may determine whether the remaining parts except for the matching part match the reference iris image based on a result of the re-perform of the iris recognition. According to various embodiments, the electronic device may repeat operations 940, 950, and 970 described above. For example, when the remaining parts of the iris image except for the matching part all match the reference iris image, the electronic device may output a recognition success message.

An operation method of the electronic device according to various embodiments of the present disclosure may include performing iris recognition, determining a part of the iris image for which the iris recognition has failed, and re-performing the iris recognition for the determined part of the iris image.

According to various embodiments, the performing of the iris recognition may include performing the iris recognition by comparing the photographed iris image with a stored reference iris image.

According to various embodiments, if the iris recognition fails, the determining of the part may include determining a part having low similarity by comparing photographed iris image data with stored reference iris image data.

According to various embodiments, the re-performing of the iris recognition may include re-photographing the iris.

According to various embodiments, the operation method may further include outputting a photographing environment control message according to the determined part of the iris image.

According to various embodiments, the re-performing of the iris recognition may include re-performing the iris recognition for the re-photographed iris image corresponding to the determined part of the iris image.

According to various embodiments, the re-performing of the iris recognition may include re-performing the iris recognition by changing at least one of a color, saturation, and brightness of at least the determined part of the iris image.

An operation method of the electronic device according to various embodiments of the present disclosure may include performing iris recognition, if the iris recognition fails, determining an area of the iris image for which the iris recognition has failed, and re-performing the iris recognition for the determined part of the iris image.

According to various embodiments, the performing of the iris recognition may include performing the iris recognition by comparing photographed iris image data with a stored reference iris image.

According to various embodiments, the determining of the area may include determining a part having low similarity by comparing photographed iris image data with stored reference iris image data.

According to various embodiments, the re-performing of the iris recognition may include re-photographing the iris.

According to various embodiments, the re-performing of the iris recognition may include re-performing the iris recognition for the re-photographed iris image corresponding to the determined part of the iris image.

According to various embodiments, the re-performing of the iris recognition may include re-performing the iris recognition by changing at least one of a color, saturation, and brightness of at least the part of the iris image data.

According to various embodiments, the operation method may further include outputting an iris recognition success message or an iris recognition failure message after the re-performing of the iris recognition.

FIG. 10 illustrates a block diagram 1000 of an electronic device 1001 according to embodiments of the present invention.

As shown in FIG. 10, the electronic device 1001 includes at least one Application Processor (AP) 1010, communication module 1020, Subscriber Identification Module (SIM) card 1024, memory 1030, sensor module 1040, input device 1050, display 1060, interface 1070, audio module 1080, camera module 1091, power management module 1095, battery 1096, indicator 1097, and motor 1098.

The AP 1010 controls a plurality of hardware or software constitutional elements connected to the AP 1010 by driving an operating system or an application program, processes a variety of data including multimedia data, and performs an arithmetic operation. The AP 1010 is implemented, for example, with a System on Chip (SoC), and may further include a Graphic Processing Unit (GPU).

The communication module 1020 performs data transmission/reception in communication between other electronic devices connected with the electronic device 1001 through a network, and includes a cellular module 1021, a Wi-Fi module 1023, a BT module 1025, a Global Positioning System (GPS) module 1027, a Near Field Communication (NFC) module 1028, and a Radio Frequency (RF) module 1029.

The cellular module 1021 provides such services as a voice call, video call, text service and Internet service, through a communication network, identifies and authenticates the electronic device within the communication network by using the SIM card 1024, and performs at least some of functions that can be provided by the AP 1010, such as multimedia control functions.

The cellular module 1021 includes a Communication Processor (CP) and is implemented, for example, with an SoC. Although constitutional elements such as the cellular module 1021, the memory 1030, and the power management module 1095 are illustrated as separate constitutional elements with respect to the AP 1010 in FIG. 10, the AP 1010 may also be implemented such that at least one element of the aforementioned constitutional elements is included.

The AP 1010 or the cellular module 1021 loads an instruction or data, which is received from each non-volatile memory connected thereto or at least one of different constitutional elements, to a volatile memory and processes the instruction or data. In addition, the AP 1010 or the cellular module 1021 stores data, which is received from at least one of different constitutional elements or generated by at least one of different constitutional elements, into the non-volatile memory.

Each of the WiFi module 1023, the BT module 1025, the GPS module 1027, and the NFC module 1028 includes, for example, a processor for processing data transmitted/received through a corresponding module. Although the cellular module 1021, the WiFi module 1023, the BT module 1025, the GPS module 1027, and the NFC module 1028 are illustrated in FIG. 10 as separate blocks, according to an embodiment, at least some two of these modules may be included in one Integrated Chip (IC) or IC package. For example, a communication processor corresponding to the cellular module 1021 and a WiFi processor corresponding to the WiFi module 1023 may be implemented with an SoC.

The RF module 1029 serves to transmit/receive data, such as an RF signal. Although not shown, the RF module 1029 includes, for example, a transceiver, a Power Amp Module (PAM), a frequency filter, and a Low Noise Amplifier (LNA), and may further include a component for transmitting/receiving a radio wave on a free space in wireless communication, such as a conductor or a conducting wire. Although it is illustrated in FIG. 10 that the cellular module 1021, the WiFi module 1023, the BT module 1025, the GPS module 1027, and the NFC module 1028 share one RF module 1029, according to one embodiment, at least one of these modules may transmit/receive an RF signal via a separate RF module.

The SIM card 1024 may be inserted to a slot formed at a specific location of the electronic device, and includes unique identification information, such as an Integrated Circuit Card IDentifier (ICCID) or subscriber information, such as an International Mobile Subscriber Identity (IMSI).

The memory 1030 includes an internal memory 1032 and an external memory 1034. The internal memory 1032 includes, for example, at least one of a volatile memory, such as a Dynamic RAM (DRAM), a Static RAM (SRAM), and a Synchronous Dynamic RAM (SDRAM) and a non-volatile memory, such as a One Time Programmable ROM (OTPROM), a Programmable ROM (PROM), an Erasable and Programmable ROM (EPROM), an Electrically Erasable and Programmable ROM (EEPROM), a Mask ROM, a Flash ROM, a NAND flash memory, and a NOR flash memory.

The internal memory 1032 may include a Solid State Drive (SSD), a flash drive, Compact Flash (CF), Secure Digital (SD), Micro Secure Digital (Micro-SD), Mini Secure digital (Mini-SD), extreme Digital (xD), and memory stick, for example. The external memory 1034 may be operatively coupled to the electronic device 1001 via various interfaces. The electronic device 1001 may further include a storage unit such as a hard drive.

The sensor module 1040 measures a physical quantity or detects an operation state of the electronic device 1001, and thus converts the measured or detected information into an electric signal. The sensor module 1040 includes, for example, at least one of a gesture sensor 1040A, a gyro sensor 1040B, an atmospheric pressure sensor 240C, a magnetic sensor 1040D, an acceleration sensor 1040E, a grip sensor 1040F, a proximity sensor 1040G, a color sensor 1040H (e.g., a Red, Green, Blue (RGB) sensor), a biometric sensor 1040I, a temperature/humidity sensor 1040J, an illumination sensor 1040K, and an Ultra Violet (UV) sensor 1040M. Additionally or alternatively, the sensor module 1040 may include, for example, an E-node sensor, an ElectroMyoGraphy (EMG) sensor, an ElectroEncephaloGram (EEG) sensor, an ElectroCardioGram (ECG) sensor, and a fingerprint sensor, and may further include a control circuit for controlling at least one or more sensors included therein.

The input device 1050 includes a touch panel 1052, a (digital) pen sensor 1054, a key 1056, and an ultrasonic input device 1058. The touch panel 1052 recognizes a touch input, for example, by using at least one of an electrostatic type, a pressure-sensitive type, and an ultrasonic type. The touch panel 1052 further includes a control circuit. When using the electrostatic type, physical contact and proximity recognition may be performed, and when using a tactile layer, the touch panel 1052 provides the user with a tactile reaction.

The (digital) pen sensor 1054 may be implemented, for example, by using the same or similar method of receiving a touch input of the user or by using an additional sheet for recognition. The key 1056 may be, for example, a physical button, an optical key, a keypad, or a touch key. The ultrasonic input device 1058 is used by the electronic device 1001 to detect a sound wave through a microphone 1088 by using a pen which generates an ultrasonic signal, and is capable of radio recognition. The electronic device 1001 uses the communication module 1020 to receive a user input from an external device connected thereto.

The display 1060 includes a panel 1062, a hologram 1064, and a projector 1066. The panel 1062 may be, for example, a Liquid-Crystal Display (LCD) or an Active-Matrix Organic Light-Emitting Diode (AM-OLED), may be implemented in a flexible, transparent, or wearable manner, and may be constructed as one module with the touch panel 1052. The hologram 1064 uses an interference of light and displays a stereoscopic image in the air. The projector 1066 displays an image by projecting a light beam onto a screen located inside or outside the electronic device 1001. The display 1060 further includes a control circuit for controlling the panel 1062, the hologram 1064, and the projector 1066.

The interface 1070 includes a High-Definition Multimedia Interface (HDMI) 1072, a Universal Serial Bus (USB) 1074, an optical communication module 1076, and a D-subminiature (D-sub) 1078. The interface 1070 may be included, for example, in the communication module 160 of FIG. 1. Additionally or alternatively, the interface 1070 includes Mobile High-definition Link (MHL), Secure Digital (SD)/Multi-Media Card (MMC) or Infrared Data Association (IrDA).

The audio module 1080 bilaterally converts a sound and electric signal. At least some constitutional elements of the audio module 1080 may be included in, for example, the input/output interface 140 of FIG. 1. The audio module 1080 converts sound information which is input or output, for example, through a speaker 1082, a receiver 1084, an earphone 1086, and the microphone 288.

The camera module 1091 is a device for image and video capturing, and according to one embodiment, includes one or more image sensors (a lens, an Image Signal Processor (ISP), and a flash, such as an LED or xenon lamp.

The power management module 1095 manages power of the electronic device 1001 and includes, for example, a Power Management Integrated Circuit (PMIC), a charger IC, or a battery gauge.

The PMIC may be placed, for example, inside an IC or SoC semiconductor. Charging is classified into wired and wireless charging. The charger IC charges a battery, and prevents an over-voltage or over-current flow from a charger. The charger IC may be for at least one of the wired and the wireless charging. The wireless charging may be classified, for example, into a magnetic resonance, magnetic induction, and electromagnetic type. An additional circuit for the wireless charging may be provided, such as a coil loop, a resonant circuit, or a rectifier.

The battery gauge measures, for example, a residual quantity of the battery 1096 and a voltage, current, and temperature during charging. The battery 1096 stores or generates electricity, and supplies power to the electronic device 1001 by using the stored or generated electricity. For example, the battery 1096 includes a rechargeable battery or a solar battery.

The indicator 1097 indicates a specific state, such as a booting, message, or charging state, of part or all of the electronic device 1001. The motor 1098 converts an electric signal into a mechanical vibration. Although not shown, the electronic device 1001 includes a processing unit for supporting mobile TV, which processing unit processes media data according to a protocol of, for example, Digital Multimedia Broadcasting (DMB), Digital Video Broadcasting (DVB), and media flow.

Each of the aforementioned constitutional elements of the electronic device according to embodiments of the present invention may include one or more components, and names thereof may vary depending on a type of electronic device. The electronic device according to embodiments of the present invention includes at least one of the aforementioned constitutional elements. Some of the constitutional elements may be omitted, or additional other constitutional elements may be further included. In addition, some of the constitutional elements of the electronic device according to embodiments of the present invention may be combined and constructed as one entity, so as to equally perform functions of corresponding constitutional elements before combination.

The term "module" used in embodiments of the present document indicates a unit including, for example, one of hardware, software, and firmware or a combination of two or more of them. The "module" may be interchangeably used with a term such as a unit, a logic, a logical block, a component, and a circuit. The "module" may be a minimum unit of an integrally constituted component or may be a part thereof. The "module" may be a minimum unit for performing one or more functions or may be a part thereof. The "module" may be mechanically or electrically implemented. For example, the "module" of the present invention includes at least one of an Application-Specific Integrated Circuit (ASIC) chip, a Field-Programmable Gate Arrays (FPGAs), and a programmable-logic device, which are known or will be developed and which perform certain operations.

According to embodiments, at least some parts of a device or operations according to embodiments of the present invention may be implemented with an instruction stored in a computer-readable storage media. If the instruction is executed by one or more processors, the one or more processors performs a function corresponding to the instruction. The computer-readable storage media may be, for example, the memory 1030. At least some parts of the programming module may be implemented, for example, by the processor 1010, and at least some parts of the programming module include modules, programs, routines, sets of instructions, and processes for performing one or more functions.

The computer readable recording medium may be a hardware device configured particularly to store and perform a program instruction, such as a hard disk, a magnetic medium such as a floppy disc and a magnetic tape, an optical storage medium such as a Compact Disc-ROM (CD-ROM) or a Digital Versatile Disc (DVD), a magnetic-optic medium such as a floptical disc, a Read Only Memory (ROM), a Random Access Memory (RAM), and a flash memory. An example of the program instruction includes not only a machine language created by a compiler but also a high-level language executable by a computer by using an interpreter. The aforementioned hardware device may be configured to operate as one or more software modules to perform operations of the present invention, and vice-versa.

The module or programming module according to embodiments of the present invention may further include at least one constitutional element among the aforementioned constitutional elements, may omit some of them, or may further include additional other constitutional elements. Operations performed by a module, programming module, or other constitutional elements according to embodiments of the present invention may be executed in a sequential, parallel, repetitive, or heuristic manner. In addition, some of the operations may be executed in a different order or may be omitted, or other operations may be added.

The invention claimed is:

1. An apparatus for performing iris recognition, comprising:
   a camera module configured to photograph an iris image; and
   a processor configured to, in response to photographing the iris image:
     obtain an iris area of the photographed iris image;
     perform a first recognition process by comparing the iris area of the photographed iris image with a stored reference iris image, wherein:
       if the iris area of the photographed iris image matches the reference iris image, the processor is configured to output a recognition success message, and
       otherwise, if the first recognition process fails, the processor is configured to obtain a part of the iris area for which the first recognition process has failed in response to comparing each part of a plurality of parts the iris area with the stored reference iris image,
     perform a second recognition process by comparing the obtained part of the iris area with the reference iris image, and
     determine whether the iris recognition is successful based on the first recognition process and the second recognition process,
     wherein the obtained part of the iris area consists of remaining parts of the iris area other than a part of the iris area which matches the reference iris image in the first recognition process.

2. The apparatus of claim 1, wherein the processor is further configured to,
   determine a similarity by comparing the iris area of the photographed iris image and the stored reference iris image, and
   obtain the part of the iris area based on the determined similarity.

3. The apparatus of claim 1, wherein, if the first recognition process fails, the processor is further configured to control the camera module to re-photograph the iris image, and
   obtain a part of the re-photographed iris image corresponding to the part of the iris area for which the first recognition process has failed as the obtained part of the iris area.

4. The apparatus of claim 3, wherein, if the first recognition process fails, the processor is further configured to output a guide information for controlling a photographing environment.

5. The apparatus of claim 1, wherein the reference iris image compared with the obtained part of the iris area comprises a part of the reference iris image corresponding to the obtained part of the iris area.

6. The apparatus of claim 1, wherein the processor is further configured to:
   obtain the part of the iris area for which the first recognition process has failed from the photographed iris image,
   change at least one of a color, saturation, and brightness of at least the obtained part of the iris area, and
   perform the second recognition process by comparing the changed part of the iris area with the reference iris image.

7. An operation method of an electronic device for performing iris recognition, the operation method comprising:
   obtaining a photographed iris image;
   obtaining an iris area of the photographed iris image;
   performing a first recognition process by comparing the iris area of the photographed iris image with a stored reference iris image, wherein:
     if the iris area of the photographed iris image matches the reference iris image, the method further comprises outputting a recognition success message, and
     otherwise, if the first recognition process fails, the method further comprises obtaining a part of the iris area for which the first recognition process has failed in response to comparing each part of a plurality of parts of the iris area with the stored reference iris image,
     performing a second recognition process by comparing the obtained part of the iris area with the reference iris image, and
     determining whether the iris recognition is successful based on the first recognition process and the second recognition process,
     wherein the obtained part of the iris area consists of remaining parts of the iris area other than a part of the iris area which matches the reference iris image in the first recognition process.

8. The operation method of claim 7, wherein the obtaining the part of the iris area comprises determining a similarity by comparing the iris area of the photographed iris image and the stored reference iris image, and obtaining the part of the iris area based on the determined similarity.

9. The operation method of claim 7, wherein the obtaining the part of the iris area comprises obtaining a re-photographed iris image, and obtaining a part of the re-photographed iris image corresponding to the part of the iris area for which the first recognition process has failed as the obtained part of the iris area.

10. The operation method of claim 9, wherein the obtaining the re-photographed iris image comprises outputting a guide information for controlling a photographing environment.

11. The operation method of claim 7, wherein the reference iris image compared with the obtained part of the iris area comprises a part of the reference iris image corresponding to the obtained part of the iris area.

12. The operation method of claim 7, wherein if the first recognition process fails, the method further comprises:
   obtaining the part of the iris area for which the first recognition process has failed from the photographed iris image,
   changing at least one of a color, saturation, and brightness of at least the obtained part of the iris area, and
   performing the second recognition process by comparing the changed part of the iris area with the reference iris image.

* * * * *